United States Patent Office 3,577,224
Patented May 4, 1971

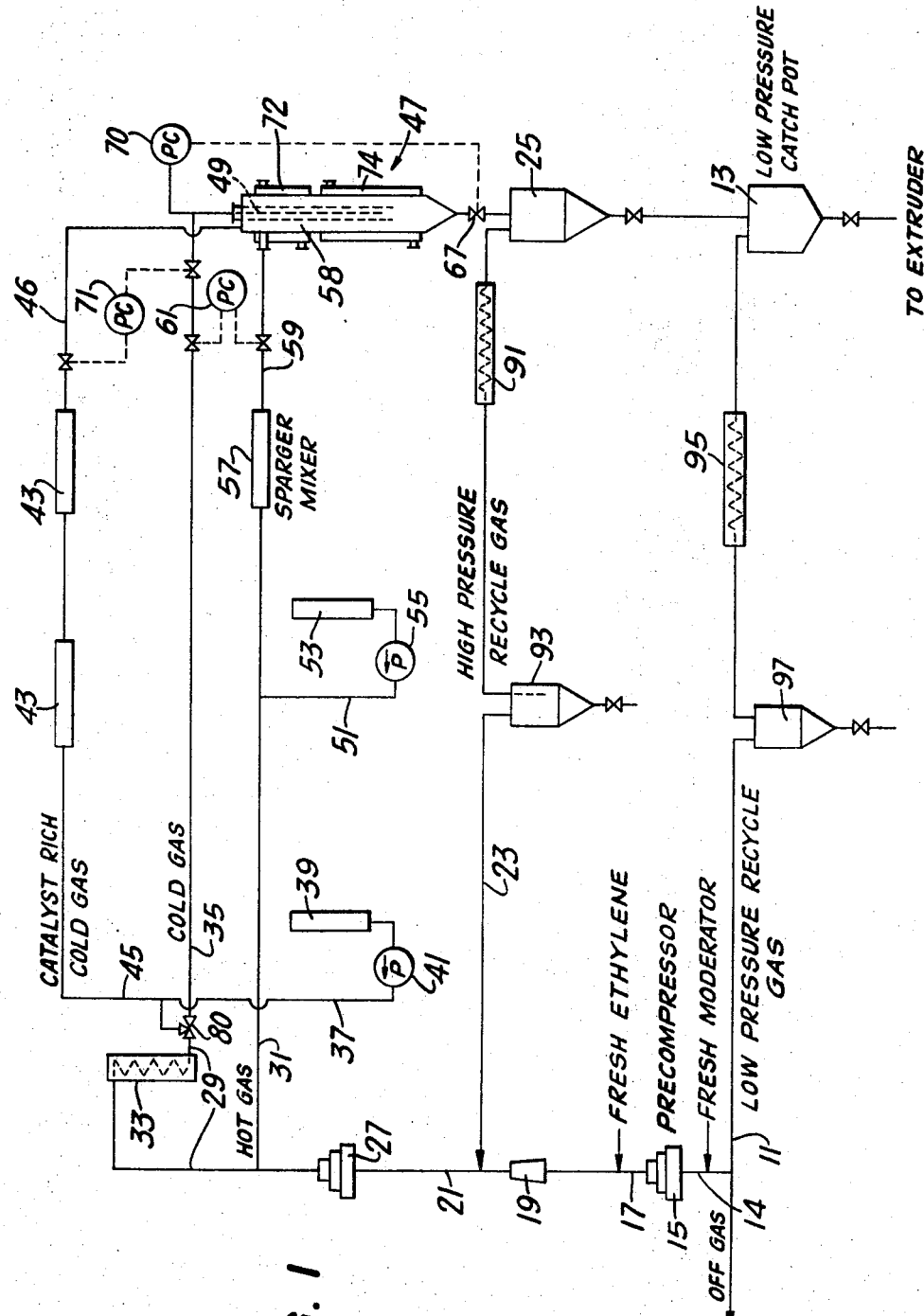

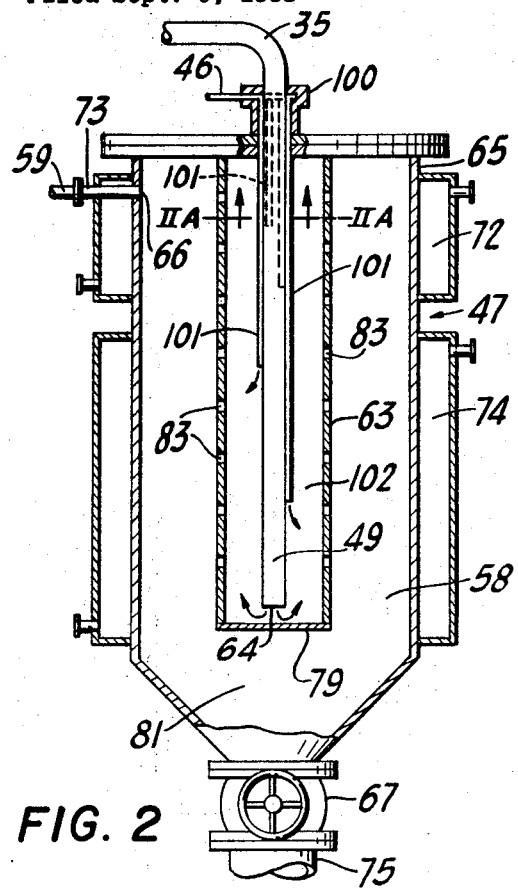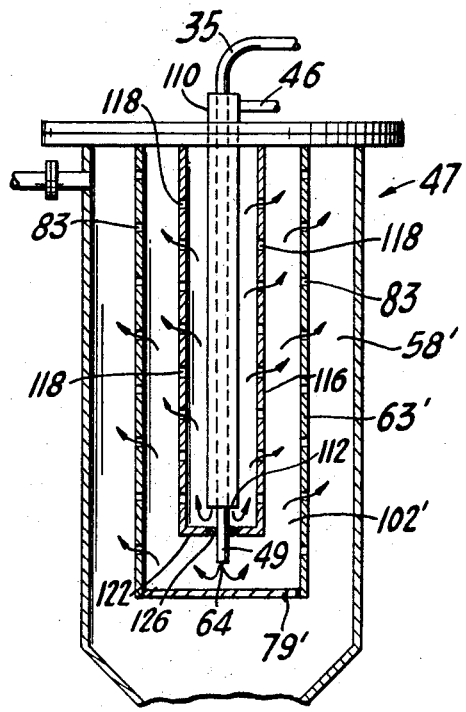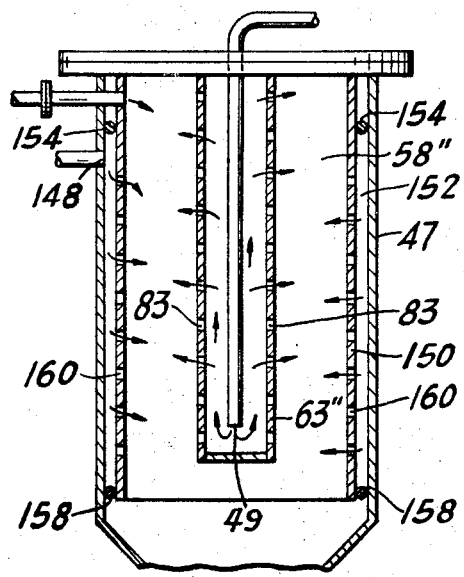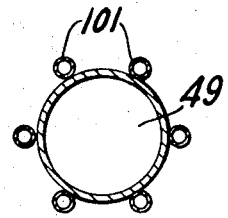

3,577,224
APPARATUS FOR PRODUCTION OF HIGH
PRESSURE POLYETHYLENE
Martin Hess, Pittsburgh, and Lawrence Saroff, Carnegie,
Pa., assignors to Sinclair-Koppers Company
Filed Sept. 9, 1968, Ser. No. 758,315
Int. Cl. B01j 9/08; C08f 1/60, 3/04
U.S. Cl. 23—285                                  3 Claims

ABSTRACT OF THE DISCLOSURE

An improved method and apparatus is provided for production of high pressure polyethylene in a sparger tube reactor. Cold ethylene gas is radially injected into the polymerization zone in variable amounts at spaced increments. Catalyst-rich gas is also injected into the polymerization zone at spaced increments in variable amounts with respect to the cold ethylene gas injection. Injection of both cold ethylene gas and catalyst-rich gas, at spaced increments and in various amounts with respect to each other provides control of reaction and, therefore, of temperature profile. Thus, an essentially constant temperature and pressure profile can be maintained throughout the polymerization zone.

BACKGROUND OF THE INVENTION

Low density (high pressure) polyethylene is produced by polymerizing ethylene at pressures of 15,000 to about 50,000 p.s.i.g. The polymerization reaction conventionally is carried out in a stirred reactor (autoclave) or in a long tube having a very high length-to-diameter ratio conventionally referred to as a tubular reactor. The polymerization is carried out using a free radical type catalyst, such as molecular oxygen or peroxide.

Both of the conventional type processes and apparatus have certain drawbacks. The autoclave or stirred reactor produces a non-uniform product because of unequal residence time of the product in the reactor. The catalyst is dispersed throughout the autoclave and, therefore, the withdrawn product also contains unexpended catalyst. The tubular reactor, on the other hand, while providing catalyst-free product, also yields a non-uniform product due to pulsating pressures used therein. This pulsating pressure is necessary for satisfactory operation of the tubular reactor which comprises a series of horizontal disposed tubes to accommodate the overall length of the reactor. The pulsating pressure prevents so-called plating out of the polymer on the walls of the reactor which would inhibit removal of heat of polymerization through the walls. To prevent this buildup, a pulsating pressure is used to move the newly formed polymer through the reactor in a peristaltic type movement. This pulsating pressure, however, results in a non-uniform product because the properties of the product are dependent on the pressure at the time of polymerization.

To overcome the foregoing problems, copending application Ser. No. 433,371, filed Feb. 17, 1965, now abandoned, by Hans M. Schappert for a "Sparger Tube Reactor" provides a novel apparatus and method for producing high pressure polyethylene embodying the desirable features of both the autoclave and tubular reactors and eliminating the drawbacks attending both of the prior art designs. In accordance with the method and apparatus described therein, ethylene is polymerized while controlling the exothermic heat by the radial injection of cold ethylene gas from a central sparger tube within the reactor. Since the heat is not removed primarily through the walls of the reactor, the length need not be as great as the tubular reactor; thus, the sparger tube reactor can be maintained at a vertical position and the pressure held substantially uniform. Uniform pressure and temperature thus assure a uniform product. Furthermore, since the reaction is progressive, the removed product at the bottom of the sparger tube reactor is formed in a uniform residence time and is free of catalyst as well.

The polymerization system described in the aforementioned patent application contemplated injection of cold ethylene containing catalyst previously mixed with the cold ethylene in recognition of the fact that, in addition to absorption, of sensible heat of the reaction, the cold ethylene was supplying fresh monomer to the reaction. Thus, the deplenished catalyst concentration would result in the fresh ethylene not polymerizing sufficiently which would, in turn, result in a product containing unpolymerized monomer or at least insufficiently polymerized ethylene polymer. However, since the catalyst was homogeneously mixed into the cold ethylene stream prior to the injection of the stream into the reactor, the catalyst concentration in the cold stream was constant regardless of where the cold ethylene was entering the polymerization zone. Operation and analysis of that process and apparatus, however, has revealed that the addition of fresh monomer to the reaction results in the need for further control of the reaction by more adequate control of the amount of catalyst in the cold ethylene being sparged into the reactor. As stated previously, a lack of catalyst in the injected monomer results in insufficient polymerization of the newly injected monomer. In contrast, the injection of too much catalyst could result in hot spots or at least promote the reaction to the extent that the heat generated by reaction of the freshly added ethylene would negate the sensible heat absorbing property or capability of the newly injected cold ethylene monomer. This amount or ratio of catalyst has not only been found to be critical, but it has been found that the critical amount of catalyst required at a particular point with respect to the amount of ethylene injected at that point can vary with respect to the catalyst-monomer ratio necessary at any other given point in the reactor, to provide control of temperature at any point in the reactor, and thus assure a uniform temperature profile in the reactor which, as stated previously, is a prerequisite to the production of a uniform polyethylene polymer.

SUMMARY OF THE INVENTION

In accordance with the invention, an improved system for the production of high pressure polyethylene in a sparger tube reactor is provided. The ethylene gas is compressed to a pressure about 15,000 p.s.i.g. and divided into a first stream having an elevated temperature sufficient to initiate the polymerization reaction and a second stream cooled to a temperature below 60° C. The hot gas flows through the reactor while at least a portion of the cold gas is radially injected into the first stream in controlled increments at a multiplicity of points along the polymerization zone. The remainder of the cold gas is mixed with catalyst to form a catalyst-rich ethylene gas which is then injected into the reactor in controlled increments at a multiplicty of points along the polymerization zone independently of the cold ethylene injection. Furthermore, the respective rates of injection of cold gas and catalyst-rich gas are independently controlled whereby any desired temperature profile and preferably an essentially constant temperature and pressure profile is maintained throughout the polymerization zone.

BRIEF DESCRIPTION OF THE DRAWINGS

FIG. 1 is a schematic diagram of the novel polymerization system.

FIG. 2 is a vertical cross-section of a sparger reactor.

FIG. 2a is a horizontal cross-sectional view of a portion of the reactor of FIG. 2 taken along lines A—A.

FIG. 3 is a vertical cross-section of an alternate embodiment of the sparger reactor.

FIG. 4 is a vertical cross-section of another alternate embodiment of the sparger reactor.

DETAILED DESCRIPTION

Turning to the novel reactor system, illustrated schematically in FIG. 1, recycle ethylene in line 11 from the low pressure catch pot 13 is mixed in line 14 with a suitable Melt Index moderator or telogen, such as, for example, butane. The amount of telogen added is adjusted to provide a telogen concentration in the ethylene fed to the reactor of from about 1 to 3 mole percent.

The mixture of ethylene and telogen is precompressed in a precompressor 15 and is mixed in line 17 with fresh ethylene from a conventional source (not shown). The latter mixture is then compressed in a booster compressor 19 flowed through line 21 where it is mixed with recycle ethylene coming from the high pressure catch pot 25 through line 23. The ethylene is then further compressed in a hypercompressor 27 to the reaction pressure of from about 15,000 to 50,000 p.s.i.g.

The feed stream from compressor 27 is divided into cold gas stream 29 that amounts to from about 70 to 90 percent by weight of the total ethylene feed and hot gas stream 31. Hot gas stream 31 is preferably maintained at a temperature above 120° C. to insure initiation of the polymerization. However, the temperature can be lower if the particular catalyst used is capable of initiating the polymerization at a lower temperature. The hot gas stream passes from hypercompressor 27 to line 31 where catalyst solution is pumped by high pressure pump 55 from reservoir 53 through line 51 and injected into the hot gas stream. From 1 to 15 parts by weight per million of either oxygen or liquid catalysts, such as those used in the cold gas, are added to the hot gas. It has been found that the addition of catalyst prevents the fouling of the conduit walls which is believed to be caused by the thermal polymerization of low molecular polymer residues present in the recycled ethylene which then adhere to the conduit walls. However, if fresh ethylene is used exclusively as the hot gas, no catalyst is required, since the gas can be preheated to the required temperature without fouling the conduit walls. The catalyst and hot gas are thoroughly mixed in sparger mixer 57, and the mixture is passed through line 59 to annular space 58 of sparger reactor 47.

The cold gas stream in line 29 is cooled by cooler 33 to as low as is practical, advantageously, to a temperature of between —50 and +60° C. The cold gas stream is then divided into two parts by distribution valve 80. Line 35 carries the bulk of the stream to dip pipe 49 of the sparger tube reactor.

A smaller portion of the cold gas stream flows through line 45 and acts as a carrier for the catalyst to be injected into the reactor, in accordance with the invention, in controlled increments at a multiplicity of points. The catalyst solution is pumped by high pressure pump 41 from reservoir 39 through line 37 into the cold gas stream in line 45. The catalyst concentration in the cold ethylene can range, for example, between 1 to 15 parts per million, or may be higher, depending upon the particular catalyst and upon the operating pressure with lower catalyst concentration being used as the operating pressure is increased. The cold ethylene stream containing catalyst is hereinafter termed catalyst-rich ethylene stream. Advantageously, a liquid catalyst system is used as the primary catalyst for the catalyst-rich cold gas stream, and it is to be understood that the purpose of this stream is to inject catalyst, not additional ethylene, into the reactor; the additional ethylene is injected only by virtue of its use as a carrier gas. Particularly, useful catalysts are peroxidic compounds such as lauroyl peroxide, ditertiarybutyl peroxide, diisopropylperoxy dicarbonate, diethyl peroxide, dimethyl peroxide, tertiarybutyl hydroperoxide, dicumyl peroxide, tertiarybutyl perbenzoate, tertiarybutyl peracetate, azo catalysts, such as azobisisobutyronitrile, oximines, such as acetoxime, and the like.

The catalyst component is usually, but not necessarily, dissolved in a substantially inert organic liquid diluent. Aliphatic and aromatic hydrocarbons are preferred diluents. Benzene is an excellent medium for the catalyst in the production of consistently high quality polyethylene. Other useful diluents include hexane, cyclohexane, toluene, heptane, solvent naphtha, and the like. If an inert diluent is used as a carrier for the catalyst, the catalyst comprises about 1 to 50 mole percent of the total solution.

The catalyst and cold gas in line 45 are thoroughly mixed in sparger mixers 43 such as described in copending application Ser. No. 347,585, now Patent No. 3,405,115. The cold gas and catalyst mixture then passes through line 46 into the sparger tube reactor to be discharged therein in a manner to be hereinafter described.

The relative pressures between the catalyst-rich cold gas stream in line 46, the cold gas stream in line 35, and the hot gas stream in line 59 are regulated and adjusted by pressure controllers, with the streams in lines 46 and 35 being at a higher pressure than the hot gas in line 59 so that the cold gas stream and the catalyst-rich gas stream will be at higher pressures than the hot gas in annular space 58 in reactor 47. This assures that the cold gas stream and the catalyst-rich stream will pass out through the sparging apertures and mix and polymerize with the hot gas in annular reaction space 58. Pressure controller 61 is used to adjust the pressure differential between lines 35 and 59, while pressure controller 71 is used to adjust the pressure differential between lines 46 and 35. In this way, the pressure in lines 35 and 46 can be regulated to be approximately equal or one may be slightly higher than the other depending upon the desired mode of injection as will hereinafter be described.

The cold gas stream and the catalyst-rich stream are injected into the reactor through a number of apertures hereinafter to be more fully described which are arranged in position, size, and number to maintain the temperature and catalyst concentration with respect to amount of ethylene essentially constant throughout the reaction space 58 to insure production of a uniform polymer product.

Polyethylene and ethylene are continuously removed from sparger reactor 47 through letdown valve 67 that is operated by pressure controller 70 so that constant pressure conditions are maintained in reactor 47. If the pressure increases, pressure controller 70 will operate to cause letdown valve 67 to open more fully; if the pressure decreases, pressure controller 70 will operate to cause letdown valve 67 to close somewhat.

From letdown valve 67, the ethylene and polyethylene pass into high pressure catch pot 25 where the high pressure ethylene recycle gas is removed from the top of catch pot 25 and is recycled to the reactor through line 23. The ethylene is cooled in heat exchanger 91 and any dissolved waxes are removed in trap 93. The polyethylene and remaining ethylene are then directed to low pressure catch pot 13 where the remaining ethylene is removed and proceeds in part back to the reactor through line 11, after passing through heat exchanger 95 and trap 97, the remainder being released as off-gas. The product polyethylene is removed from the bottom of the low pressure catch pot 13 to further processing equipment, such as an extruder.

The reactor 47 can be provided with an outer jacket divided into two sections 72 and 74 through which a temperature controlling medium such as water can be circulated to provide for the addition or removal of heat from the reactor. The upper portion 72 can be used to heat the hot gas to the initiating temperature prior to its being mixed with the cold gas, whereas the lower portion 74 can be used to remove heat from the reactor in order to increase conversion rates. Another purpose of the jacket is to facilitate the starting up of the polymerization.

Turning now to FIG. 2, reactor 47 comprises an impervious metal tube 65 having an inlet tube 73 at the top and an outlet tube 75 at the bottom in which letdown valve 67 is arranged. The diameter and wall thickness of reactor tube 65 will depend upon the operating pressure to be employed. Advantageously, the ratio of the diameter of reactor tube 65 to its length is from about 1:30 to 1:300. Sparger tube 63 is arranged coaxially within reactor tube 65 to provide an annular space 58 for the bulk of the polymerization and a space 81 below the end 79 for the completion of the polymerization prior to the discharge of the polymerization mixture from the reactor. The outer diameter of sparger tube 63 is selected to give the required reactor volume 58 for the selected operating pressure and throughput.

A dip tube 49 externally connected to cold gas line 35 extends coaxially within sparger tube 63 and reactor 65 and has an outlet end 64 terminating just above the plug end 79. Dip pipe 49 keeps the cold ethylene feed gas from being subjected to the reactor temperatures until the ethylene has reached the end of sparger tube 63.

Apertures 83 are arranged in sparger tube 63 such that the proper amount of cold gas is injected into each portion of reactor space 58 to maintain relatively constant conditions of temperature and catalyst concentration throughout the reactor. The total amount of ethylene passing a given point in the reactor for a given time increases toward the bottom of the reactor and increasing amounts of ethylene can be injected into the reactor as the bottom of sparger tube 63 is reached by providing an increasing number of apertures per unit length as the lower end of the sparger tube 63 is approached.

Space 81 below the end of sparger tube 63 permits the polymerization reaction to be completed prior to the removal of the ethylene and polyethylene from the reactor.

While the embodiment of the reactor shown in FIGS. 1 and 2 shows jackets 72 and 74 through which a cooling medium such as water can be circulated to remove additional heat from the polymerization, the presence or use of this jacket is not essential. In fact, an important advantage of the sparger tube reactor is that high conversion rates can be achieved without the need for external cooling since the heat of polymerization can be absorbed by the cold gas. This is illustrated by the fact that, in the operation of the reactor system shown in FIGS. 1 and 2, described below, no cooling media was circulated through jacket 74.

A series of tubes 101 are clustered peripherally about dip tube 49 as shown more clearly in FIG. 2a. Tubes 101 are all interconnected together externally of the reactor through a manifold 100 which surrounds dip tube 49 atop the reactor. Tubes 101 are of varying lengths. These tubes carry the catalyst-rich gas stream into the reactor from line 46 through manifold 100. The lengths and diameters of the tubes are selected and adjusted to provide variable increments of catalyst at various points in the sparger tube.

The location of tubes 101 within sparger tube 63 in this embodiment allows the catalyst-rich ethylene gas to mix with the cold ethylene gas entering from dip tube 49 before passing through apertures 83 into the reaction zone 58. In this embodiment, a slight positive pressure in line 46 with respect to line 35 is desirable to affect proper mixing of the cold streams. Although this embodiment illustrates each of the tubes 101 in direct communication with manifold 100 and thus contemplates selection of proper tube lengths based on previous calculations, it will be readily appreciated by those skilled in the art that valves can be mounted respectively on each of the tubes 101 after exiting from manifold 100 to provide computerized control of the amount of flow in each of the tubes 101.

In the operation of the reactor system shown in FIGS. 1 and 2, a catalyst system was selected which would sustain the reaction temperature at 240° C. over a residence time of 10 seconds in the reactor under an operating pressure of 35,000 p.s.i.g. The total throughput of 8600 lbs./hr. of ethylene was split into 1000 lbs./hr. (11.6 percent) hot gas and 7600 lbs./hr. (88.4 percent) cold gas. The catalyst used had an initiating temperature of 140° C. At an average operating temperature of 240° C., a conversion rate of 14.8 percent was achieved. Low pressure recycle gas in the amount of 1000 lbs./hr. was compressed to 375 p.s.i.g. in precompressor 15 and 6 lbs./hr. of fresh telogen, butane, was added. The fresh telogen was sufficient to maintain a telogen concentration of 1.0 percent by volume in the ethylene feed to the reactor. Fresh ethylene of 99.9 percent purity was added to the precompressed recycle gas in the amount of 1500 lbs./hr. and the mixture was compressed in booster compressor 19 to a pressure of 3500 p.s.i.g. The mixture was then mixed in line 21 with high pressure recycle gas coming from line 23 in an amount of 6100 lbs./hr. to make up the throughput of the reactor of 8600 lbs./hr. of ethylene. The ethylene was then compressed in hypercompressor 27 to a discharge pressure of 35,000 p.s.i.g.

As stated above, the total discharge from hypercompressor 27 of 8600 lbs./hr. of ethylene was split into 7600 lbs./hr. of cold gas and 1000 lbs./hr. of hot gas. The cold gas stream in line 29 was then divided at distribution valve 80 into two parts comprising approximately 7000 lbs./hr. of cold gas flowing through line 35 and about 600 lbs./hr. flowing through line 45 as a carrier for the catalyst.

A liquid catalyst solution consisting of 4 mole percent of 50 percent (molar basis) t-butylperbenzoate and 50 percent (molar basis) dicumyl peroxide, in benzene, from reservoir 39 was introduced into the cold gas stream in line 45. The pumping rate of the catalyst pump 41 was two gal./hr. so that the catalyst concentration in the catalyst-rich cold gas stream was about 765 parts by weight per million. This quantity of catalyst sustained the reaction throughout the reactor at 240° C.

The catalyst-rich cold ethylene gas then passed through sparger mixer 43 to equalize the effect of the catalyst pump so that the cold gas had a uniform catalyst concentration. The cold gas flowed through line 46 into manifold 100 and thence through tubes 101 out to space 102 inside sparger tube 63. There it mixed with the cold gas from line 35 entering space 102 through the end 64 of dip tube 49. The cold gas and catalyst-rich gas mixture then entered annular space 58 through apertures 83 where it mixed with the hot gas entering the reactor through nozzle 66.

The hot gas in the amount of 1000 lbs./hr., coming from hypercompressor 27, had a temperature of 106° C. Catalyst consisting of 2 mole percent of lauroyl peroxide dissolved in benzene was added to the hot gas in line 31 through line 51 by means of pump 55 whose pumping rate was 0.3 gal./hr., giving a catalyst concentration of about 10 parts by weight per million in the hot gas. Sparger mixer 57 equalized the concentration peaks produced by the stroke of catalyst pump 53. The hot gas then passed into annular space 58 through nozzle 66. The hot gas reached a temperature of 170° C. in the upper end of reactor 47 due to being heated by hot water circulated through jacket 72 and the heat produced by the beginning of polymerization at 140° C. The sparger tube apertures 83 started about 1 foot below the introduction point of the hot gas, which gave the residence time necessary for the hot gas to heat at 170° C. prior to being mixed with the catalyst containing cold gas entering space 58 through apertures 83. Pressure controllers 61 and 71, respectively, between the cold gas and the catalyst-rich lines and the hot gas line kept a predetermined pressure differential to assure a constant flow of cold gas into the annular space 58.

The sparger tube was designed in regard to the number of apertures, the diameter of the apertures ($\frac{1}{32}$ inch bore), and their spacing in such a way that, for the catalyst system used, a temperature dip of a maximum of 3° C.

caused by the injection of cold gas was produced at the operating temperature of 240° C. The length of the sparger tube was such that over a residence time of 10 seconds in the reactor, the reaction was totally completed when the bottom of the reactor was reached.

Letdown valve 67 arranged at the bottom of reactor 47 provided for a constant pressure of 35,000 p.s.i.g. in the reactor and the continuous constant withdrawal of ethylene containing polyethylene. The continuous withdrawal, without the need for a periodic pressure letdown as in conventional tubular reactors is an advantage of the sparger tube reactor because the polyethylene is totally in solution at the applicable high pressures and the reactor is relatively short and vertical thus not tending to plug.

In the high pressure catch pot 25, which was operated at a pressure of 35,000 p.s.i.g., the ethylene and polyethylene were separated. The ethylene was removed at the top of the high pressure catch pot and passed through cooler 91 in which the gas was cooled to 50° C. Condensate and waxes were withdrawn from the trap 93. The high pressure recycle gas was then mixed with the discharge of booster compressor 19.

The polymer and residual ethylene were then transferred from the high pressure to the lower pressure catch pot 13 where the product polyethylene was separated from the remaining ethylene and the ethylene returned through heat exchanger 95, trap 97, and line 11 to precompressor 15. The product polyethylene was then removed from the low pressure catch pot to conventional processing equipment. A conversion rate of about 14.8 percent was determined by dividing the amount of polyethylene produced (1270 lbs./hr.) by the total throughput of 8600 lbs./hr.

It should be noted that an alternate or modified construction of the apparatus in FIG. 2 (not illustrated) can be provided wherein dip tube 49 is also provided with apertures so that all of the cold ethylene need not travel to end 64 of dip tube 49 before dispersing into mixing zone or space 102 within sparger tube 63. This can provide still further control of the catalyst-rich gas-cold ethylene ratio.

Referring now to FIG. 3, an alternate apparatus is illustrated. In this embodiment, the catalyst-rich gas in line 46 enters the reactor through dip tube 110 which surrounds dip tube 49. Dip tube 110 is solid and extends downwardly terminating just short of the end of dip tube 49. Dip tube 110 is open at its bottom end 112 allowing the catalyst-rich gas to exit from dip tube 110. Surrounding dip tube 110 is a perforated sparger tube 116. Sparger tube 116 extends from the top of reactor 47 to a point about midway between the end of dip tube 110 and the end of dip tube 49. Sparger tube 116 has a closed bottom end 122 which can be sealed to dip tube 110 by an O-ring 126 or the like. The catalyst-rich gas from the dip tube 110 is then forced into sparger tube 116 from which it exits via openings 118 in sparger tube 116. Surrounding sparger tube 116 is a larger and longer sparger tube 63'. Sparger tube 63' extends downwardly beneath dip tube 49 and has a closed end 79'. The cold ethylene gas leaves dip tube 49 at 64 entering sparger tube 63' and mixing in the annular space 102', between the inner wall of sparger tube 63' and the outer wall of sparger tube 116, with the catalyst-rich gas leaving sparger tube 116 via openings 118. The cold ethylene gas-catalyst-rich gas mixture then enters polymerization zone 58' via openings 83 and sparger tube 63'. The size and spacing of the holes 83 are selected to provide a uniform temperature profile throughout polymerization zone 58' to insure uniformity of product polyethylene which, as mentioned previously, is dependent upon uniform temperature and pressure during polymerization. In accordance with the invention, the size and spacing of the holes 118 in inner sparger tube 116 are selected to insure proper proportion of catalyst to gas at each point in polymerization zone 58' to insure the uniform temperature by controlling the additional polymerization heat generated by polymerization of the fresh ethylene being sparged into the polymerization zone. Thus, control of the amount of catalyst, by controlling the reaction, and, therefore, the amount of reaction generated heat, prevents the cold ethylene gas from self-defeating its purposes by generating more heat by polymerization than it absorbs by virtue of its incoming temperature.

It should be noted here that the embodiments illustrated in FIGS. 2 and 3 mix the catalyst-rich gas with the cold ethylene gas prior to injection into the polymerization zone. The mixture of gases is then radially injected into the polymerization zone containing the hot gas stream from line 59 as well as polymerized material. While this insures proper mixture before exposure to polymerization and heat exchange and is, therefore, the preferred embodiment, an alternate method and apparatus is illustrated in FIG. 4. In FIG. 4, the cold ethylene gas is radially injected into the reactor via dip tube 49 into sparger tube 63" and the catalyst-rich gas is peripherally injected via a perforated shell or sleeve 150 which is slightly smaller in diameter than reactor 47. If desired, the dip tube 49 can be omitted and the cold ethylene gas fed directly into the top portion of the sparger tube 63" and therethrough radially injected into the reactor. The annular space 152 formed between the wall of reactor 47 and the outer surface of shell 150 is filled with catalyst-rich gas via a suitable opening 148 in the reactor wall. Shell 150 is sealed at the top and bottom to the reactor wall by O-rings 154 and 158. The catalyst-rich gas leaves shell 150 via openings 160 and is peripherally injected into polymerization zone 58". The size and spacing of the openings 160 as well as openings 83 in sparger tube 63" are predetermined to provide the proper amount of catalyst-rich gas and cold ethylene gas in the polymerization zone to achieve a uniform temperature profile throughout the polymerization zone.

The present process and apparatus results in a uniform-homogeneous, ethylene polymer characterized by low molecular weight distribution by virtue of its production in a uniform temperature and pressure polymerization zone not previously achievable. The novel process and apparatus provides a system for the continuous production of ethylene polymer in which the temperature profile can be controlled throughout the polymerization zone. Thus, the invention combines the advantages of the autoclave and the tubular reactor while eliminating the major disadvantages.

What is claimed is:

1. In an apparatus for polymerizing ethylene comprising means for compressing ethylene to a pressure above 15,000 p.s.i.g.; means for dividing the compressed ethylene into two streams; means for heating the first stream to a temperature sufficient to initiate the polymerization reaction; means for coaxially flowing said first stream through a reactor; means for cooling a second stream below 60° C.; and means for radially injecting the second cooled stream into the reactor in controlled increments at a multiplicity of points in the reactor, the improvements which comprise: means for injecting polymerization catalyst in controlled increments at a multiplicity of points in the reactor independent of the injection of gas from said cooled second stream and means for independently controlling the respective rates of injection of polymerization catalyst and cold ethylene to control the reaction temperature throughout the reactor; wherein said means for injecting polymerization catalyst in controlled increments comprises a plurality of feed tubes of varying length interposed between said means for injecting said second cooled stream and a closed end perforated tube in which said polymerization catalyst and said second cooled stream are mixed and radially injected into a polymerization zone.

2. In an apparatus for polymerizing ethylene comprising means for compressing ethylene to a pressure above 15,000 p.s.i.g.; means for dividing the compressed ethylene into two streams; means for heating the first stream to a temperature sufficient to initiate the polymerization reaction; means for coaxially flowing said first stream through a reactor; means for cooling a second stream below 60° C.; and means for radially injecting the second cooled stream into the reactor in controlled increments at a multiplicity of points in the reactor, the improvements which comprise: means for injecting polymerization catalyst in controlled increments at a multiplicity of points in the reactor independent of the injection of gas from said cooled second stream and means for independently controlling the respective rates of injection of polymerization catalyst and cold ethylene to control the reaction temperature throughout the reactor; wherein said means for injecting polymerization catalyst comprises a tubular member coaxially surrounding in spaced relationship, a tube for injecting said second cooled stream, whereby said catalyst is radially injected into a mixing chamber through a first perforated closed-end tube, mixed with said cooled stream, and said mixture is radially injected through a second closed-end perforated tube into a polymerization zone.

3. In an apparatus for polymerizing ethylene comprising means for compressing ethylene to a pressure above 15,000 p.s.i.g.; means for dividing the compressed ethylene into two streams; means for heating the first stream to a temperature sufficient to initiate the polymerization reaction; means for coaxially flowing said first stream through a reactor; means for cooling a second stream below 60° C.; and means for radially injecting the second cooled stream into the reactor in controlled increments at a multiplicity of points in the reactor, the improvements which comprise: means for injecting polymerization catalyst in controlled increments at a multiplicity of points in the reactor independent of the injection of gas from said cooled second stream and means for independently controlling the respective rates of injection of polymerization catalyst and cold ethylene to control the reaction temperature throughout the reactor; wherein said means for injecting said second cooled stream coaxially surrounds a polymerization zone and said polymerization zone coaxially surrounds said means for injecting said first stream, with said first stream being radially injected into said polymerization zone and said second stream being peripherally injected into said polymerization zone, and both said streams are mixed in said polymerization zone.

References Cited
FOREIGN PATENTS

| | | |
|---|---|---|
| 942,265 | 11/1963 | Great Britain. |
| 1,010,847 | 11/1965 | Great Britain. |
| 1,062,408 | 3/1967 | Great Britain. |

JAMES A. SEIDLECK, Primary Examiner

E. J. SMITH, Assistant Examiner

U.S. Cl. X.R.

23—284, 289; 260—94.9